United States Patent
Nagaoka

(10) Patent No.: US 11,235,822 B2
(45) Date of Patent: Feb. 1, 2022

(54) TRACK ROLLER FOR TRACKED VEHICLE

(71) Applicant: KOMATSU LTD., Tokyo (JP)

(72) Inventor: Takeya Nagaoka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 474 days.

(21) Appl. No.: 16/084,623

(22) PCT Filed: Jun. 13, 2017

(86) PCT No.: PCT/JP2017/021767
§ 371 (c)(1),
(2) Date: Sep. 13, 2018

(87) PCT Pub. No.: WO2017/221764
PCT Pub. Date: Dec. 28, 2017

(65) Prior Publication Data
US 2019/0077474 A1  Mar. 14, 2019

(30) Foreign Application Priority Data

Jun. 20, 2016 (JP) .............................. JP2016-121782

(51) Int. Cl.
*B62D 55/14* (2006.01)
*B62D 55/15* (2006.01)
*E02F 9/02* (2006.01)

(52) U.S. Cl.
CPC ........... *B62D 55/145* (2013.01); *B62D 55/14* (2013.01); *B62D 55/15* (2013.01); *E02F 9/02* (2013.01)

(58) Field of Classification Search
CPC ....... B62D 55/14; B62D 55/145; B62D 55/15
See application file for complete search history.

(56) References Cited

U.S. PATENT DOCUMENTS 3,843,214 A * 10/1974 Piepho .................. B62D 55/15
305/119
3,871,719 A *  3/1975 Boggs .................... B62D 55/15
305/136

(Continued)

FOREIGN PATENT DOCUMENTS

CN      201980314 U    9/2011
CN      203637968 U    6/2014

(Continued)

OTHER PUBLICATIONS

The International Search Report for the corresponding international application No. PCT/JP2017/021767, dated Sep. 5, 2017.

(Continued)

*Primary Examiner* — Jason R Bellinger
(74) *Attorney, Agent, or Firm* — Global IP Counselors, LLP

(57) ABSTRACT

A track roller includes a roller shell, a first retainer, a second retainer, a first holding ring, and a second holding ring. The first retainer is press-fitted to the outer periphery of a shaft and abuts on a first end face of the roller shell. The second retainer is press-fitted to the outer periphery of the shaft and abuts on a second end face of the roller shell. The first holding ring is attached to the outer periphery of the shaft on the outside of the first retainer and fixes the first retainer. The second holding ring is attached to the outer periphery of the shaft and fixes the second retainer.

8 Claims, 4 Drawing Sheets

(56) References Cited

U.S. PATENT DOCUMENTS

| | | | |
|---|---|---|---|
| 4,640,559 A | | 2/1987 | Crotti |
| 4,695,102 A | * | 9/1987 | Crotti .................. B62D 55/092 |
| | | | 305/100 |
| 5,553,931 A | | 9/1996 | Diekevers |
| 6,364,438 B1 | * | 4/2002 | Hasselbusch .......... B62D 55/08 |
| | | | 277/912 |
| 6,851,768 B2 | * | 2/2005 | Takeno ................. B62D 55/21 |
| | | | 29/894.012 |
| 6,874,859 B1 | * | 4/2005 | Duse ..................... B62D 55/15 |
| | | | 305/136 |
| 7,108,337 B2 | * | 9/2006 | Yamamoto ............. B62D 55/14 |
| | | | 305/129 |
| 7,213,894 B2 | * | 5/2007 | Yamamoto ............. B62D 55/15 |
| | | | 305/119 |
| 8,231,184 B2 | * | 7/2012 | Mulligan ............... B62D 55/15 |
| | | | 305/136 |
| 8,979,219 B2 | * | 3/2015 | Hisamatsu ........... F16J 15/3256 |
| | | | 305/136 |
| 10,023,251 B2 | * | 7/2018 | Recker ................. B62D 55/088 |
| 2002/0153773 A1 | * | 10/2002 | Yoon ..................... B62D 55/15 |
| | | | 305/136 |
| 2008/0173495 A1 | | 7/2008 | Komatsu et al. |
| 2012/0228926 A1 | | 9/2012 | Bair |
| 2015/0284042 A1 | * | 10/2015 | Kalmes ................. B62D 55/14 |
| | | | 305/107 |
| 2016/0236735 A1 | | 8/2016 | Kita |

FOREIGN PATENT DOCUMENTS

| | | |
|---|---|---|
| CN | 104071243 A | 10/2014 |
| CN | 204210603 U | 3/2015 |
| CN | 205168680 U | 4/2016 |
| JP | 55-147978 U | 10/1980 |
| JP | 8-230729 A | 9/1996 |
| JP | 2000-95156 A | 4/2000 |
| JP | 2005-225335 A | 8/2005 |
| JP | 2015-147436 A | 8/2015 |
| JP | 2015-168289 A | 9/2015 |

OTHER PUBLICATIONS

The Office Action for the corresponding Chinese application No. 201780017719.8, dated May 7, 2020.

The Office Action for the corresponding Japanese application No. 2018-523917, dated Sep. 1, 2020.

The Office Action for the corresponding Chinese application No. 201780017719.8, dated Jun. 11, 2021.

* cited by examiner

# TRACK ROLLER FOR TRACKED VEHICLE

CROSS-REFERENCE TO RELATED APPLICATIONS

This application is a U.S. National stage application of International Application No. PCT/JP2017/021767, filed on Jun. 13, 2017. This U.S. National stage application claims priority under 35 U.S.C. § 119(a) to Japanese Patent Application No. 2016-121782, filed in Japan on Jun. 20, 2016, the entire contents of which are hereby incorporated herein by reference.

BACKGROUND

The present invention relates to a track roller for a tracked vehicle.

Conventionally, tracked vehicles, such as bulldozers and hydraulic excavators, have been used for work on uneven terrain. A tracked vehicle has a track-type traveling unit made up of crawler belts, sprocket wheels, idler tumblers, carrier rollers, track rollers, and the like. The crawler belt is wound around the sprocket, the idler tumbler, the carrier roller, and the track roller.

In JP-A H8-230729 is proposed a track roller having a shaft, a roller shell, a pair of bushings, and a pair of holding rings. The bushings and the holding rings rotate along with the roller shell around the shaft. The bushings are press-fitted on the inner side of the roller shell. The holding rings are attached to grooves provided on the inner peripheral face of the roller shell. Each bushing is sandwiched between a holding ring and the center flange of the shaft so that they do not move in the axial direction of the shaft. The load exerted on the roller shell is borne by the holding rings and the center flange of the shaft, via the bushings.

SUMMARY

However, with the track roller in JP-A H8-230729, because the shaft has a central flange, a problem is that the roller shell is made up of numerous parts, which makes assembly more complicated.

The present invention was conceived in light of the above situation, and it is an object thereof to provide a track roller with a simple structure.

The track roller according to a first aspect comprises a cylindrical roller shell, a shaft, a first retainer, a second retainer, a first holding ring, and a second holding ring. The shaft is inserted into the roller shell. The first retainer is press-fitted to the outer periphery of the shaft and abuts on a first end face of the roller shell. The second retainer is press-fitted to the outer periphery of the shaft and abuts on a second end face of the roller shell. The first holding ring is attached to the outer periphery of the shaft and fixes the first retainer. The second holding ring is attached to the outer periphery of the shaft and fixes the second retainer.

The track roller according to a second aspect is the track roller according to the first aspect, wherein the roller shell has a roller shell body, a first bushing, and a second bushing. The roller shell body has an insertion hole. The first bushing includes a first cylindrical section and a first flange that extends outward in the radial direction from the first cylindrical section. The first bushing abuts on the first retainer at the first flange. The second bushing includes a second cylindrical section and a second flange that extends outward in the radial direction from the second cylindrical section. The second bushing abuts on the second retainer at the second flange.

The track roller according to a third aspect is the track roller according to the first aspect, wherein the shaft has at one end a first annular groove for mounting the first holding ring, and at the other end a second annular groove for attaching the second holding ring.

The track roller according to a fourth aspect is the track roller according to any of the first to third aspects, comprising a first mounting piece and a second mounting piece. The first mounting piece is attached to the first end of the shaft and is away from the first retainer. The second mounting-piece is attached to the second end of the shaft and is away from the second retainer.

The track roller according to a fifth aspect is the track roller according to any of the first to fourth aspects, wherein the first retainer and the second retainer each have an inner peripheral face that is in contact with the outer peripheral face of the shaft, and an outer peripheral face that is provided substantially perpendicular to the inner peripheral face.

The track roller according to a sixth aspect is the track roller according to any of the first to fifth aspects, wherein the first retainer and the second retainer are each formed in a circular ring shape.

The track roller according to a seventh aspect comprises a cylindrical roller shell, a shaft, a first retainer, a second retainer, a first holding ring, a second holding ring, a first seal assembly, and a second seal assembly. The shaft is inserted into the roller shell. The first retainer is press-fitted to the outer periphery of the shaft and abuts on a first end face of the roller shell. The second retainer is press-fitted to the outer periphery of the shaft and abuts on a second end face of the roller shell. The first holding ring is attached to the outer periphery of the shaft and fixes the first retainer. The second holding ring is attached to the outer periphery of the shaft and fixes the second retainer. The first seal assembly is sealed between the roller shell and the first retainer. The second seal assembly is sealed between the roller shell and the second retainer.

The track roller according to an eighth aspect comprises a roller shell body having an insertion hole, a bushing that is press-fitted in the insertion hole and has a hollow part, a shaft that is inserted into the hollow part, a retainer that is press-fitted to the outer periphery at one end of the shaft and abuts on the bushing, and a holding ring that is attached to the outer periphery of the shaft and stops the movement of the retainer in the axial direction of the shaft.

The track roller according to a ninth aspect is the track roller-according to the eighth aspect, further comprising a seal assembly that has an inner seal and an outer seal. The retainer has a boss to which the shaft is press-fitted. The seal assembly is disposed on the outside of the boss.

The present invention provides a track roller with a simple structure.

DESCRIPTION OF EXEMPLARY EMBODIMENTS

Configuration of Bulldozer 1

Figure 1:
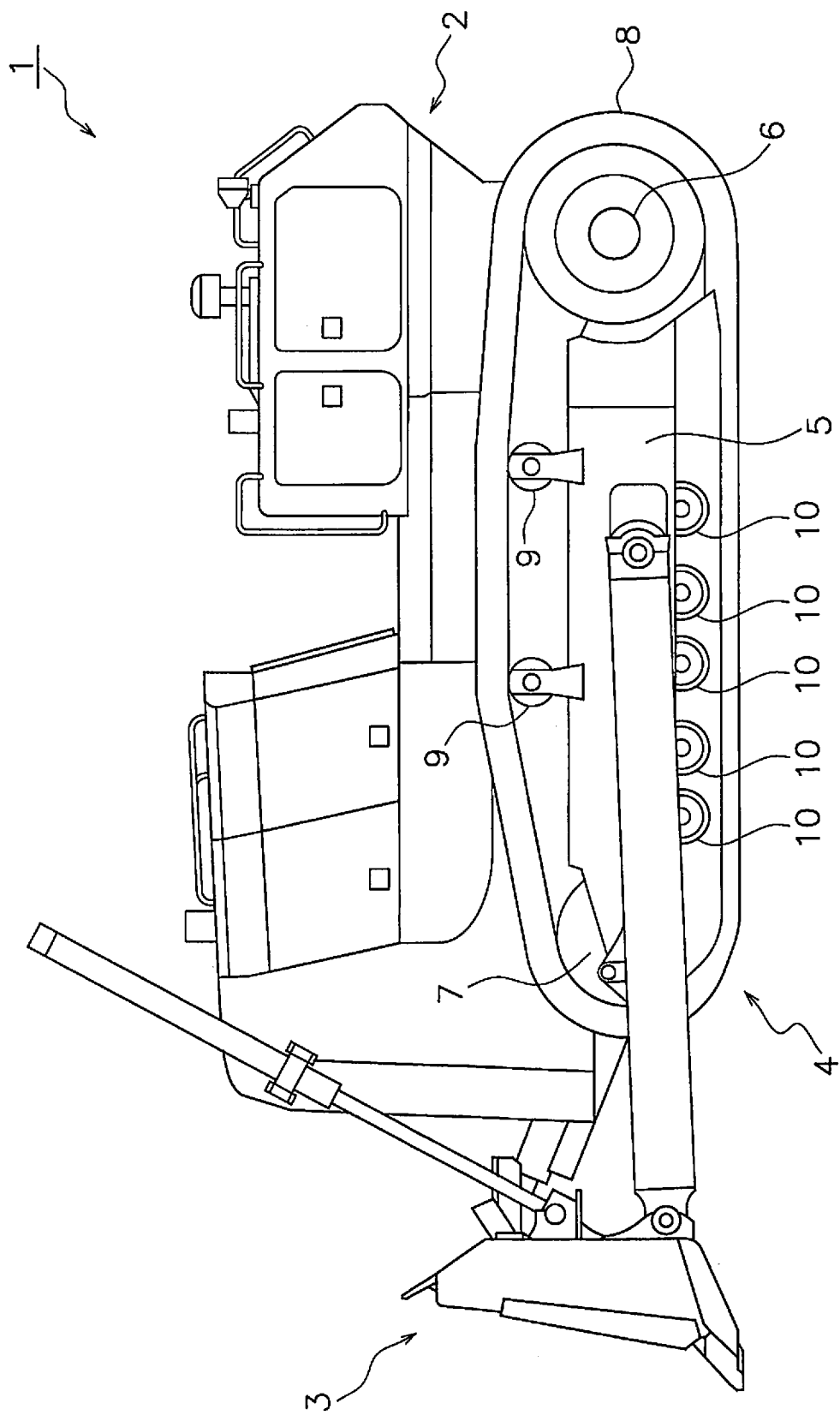
FIG. 1 is a side view of a bulldozer according to an embodiment.

The configuration of a bulldozer 1 pertaining to this embodiment will be described through reference to the drawings. FIG. 1 is a side view of the bulldozer 1.

The bulldozer 1 comprises a vehicle body 2, a blade device 3, and track-type traveling unit 4. The vehicle body 2 is supported by the track-type traveling unit 4. The blade device 3 is disposed in front of the vehicle body 2.

The track-type traveling unit 4 has a track frame 5, a sprocket wheel 6, an idler tumbler 7, a track 8, carrier rollers 9, and track rollers 10. The track frame 5 constitutes the framework of the track-type traveling unit 4. The sprocket wheel 6 is attached to the rear end portion of the vehicle body 2. The idler tumbler 7 is attached to the front end portion of the track frame 5. The track 8 is wound around the sprocket wheel 6 and the idler tumbler 7.

The carrier rollers 9 are attached to the upper face of the track frame 5. The carrier rollers 9 support the track 8 from below so that the track 8 does not sag under its own weight. The track rollers 10 are attached to the lower face of the track frame 5. The track rollers 10 distribute the body weight and transmit it to the track 8.

Configuration of Track Rollers 10

Figure 2:
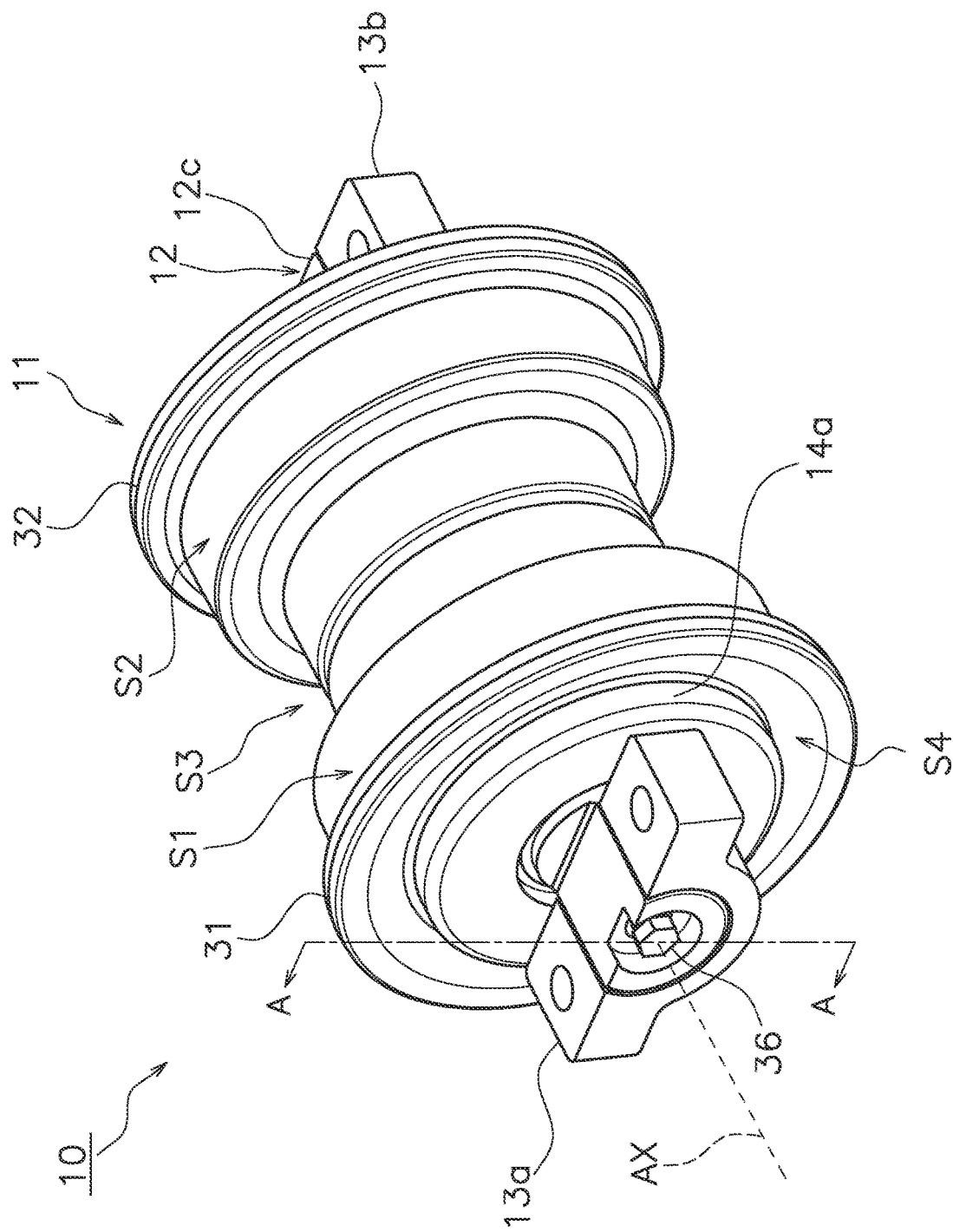
FIG. 2 is an oblique view of a track roller in this embodiment.
Figure 3:
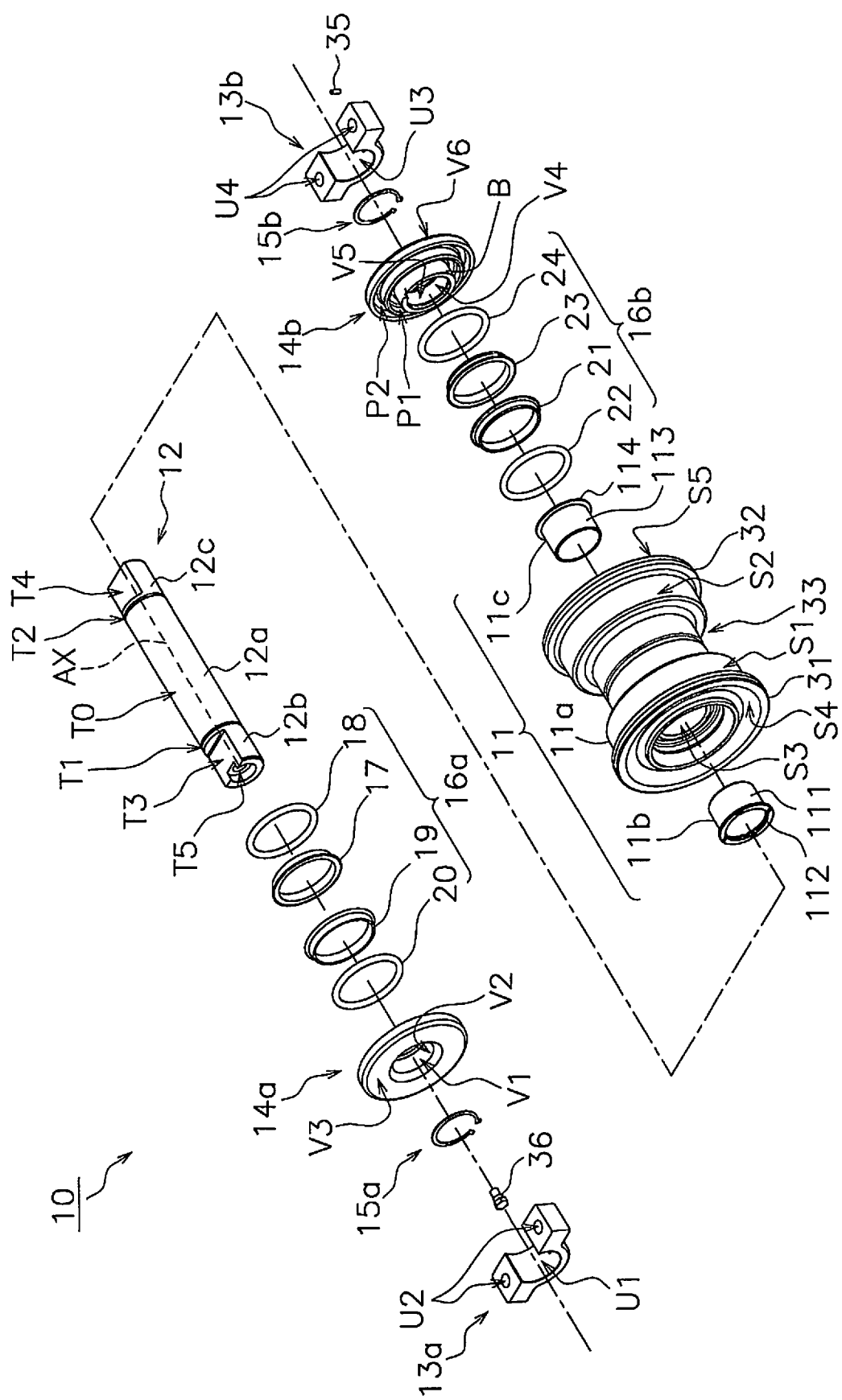
FIG. 3 is an exploded oblique view of the track roller-in this embodiment.

The configuration of the track rollers 10 in this embodiment will be described through reference to the drawings. FIG. 2 is an oblique view of a track roller 10. FIG. 3 is an exploded oblique view of the track roller 10.

The track roller 10 comprises a roller shell 11, a shaft 12, first and second mounting pieces 13a and 13b, first and second retainers 14a and 14b, first and second holding rings 15a and 15b, and first and second seal assemblies 16a and 16b.

In the following explanation, a direction parallel to the center axis AX of the shaft 12 shall be called the "axial direction," and a direction perpendicular to the center axis AX of the shaft 12 shall be called the "radial direction."

(1) Roller Shell 11

The roller shell 11 is formed in an overall cylindrical shape. The roller shell 11 rotates along with the track 8 around the center axis AX of the shaft 12. The roller shell 11 has a roller shell body 11a, a first bushing 11b, and a second bushing 11c.

The roller shell body 11a is formed in a cylindrical shape. The roller shell body 11a has a first flange 31, a second flange 32, and an annular concave portion 33. The first flange 31 is formed at one end of the roller shell body 11a. The second flange 32 is formed at the other end of the roller shell body 11a. The annular concave portion 33 is formed at the center portion of the roller shell body 11a.

The roller shell body 11a has a first guide surface S1, a second guide surface S2, and an insertion hole S3. The first guide surface S1 is formed between the first flange 31 and the annular concave portion 33. The second guide surface S2 is formed between the second flange 32 and the annular concave portion 33. The first guide surface S1 and the second guide surface S2 guide the links of the track 8 between the first flange 31 and the second flange 32. The insertion hole S3 is formed along the axis of the roller shell body 11a. The shaft 12 is inserted into the insertion hole S3.

The roller shell body 11a has a first end face S4 and a second end face S5. The first end face S4 is opposite the first retainer 14a. The second end face S5 is opposite the second retainer 14b.

The first bushing 11b is inserted into the insertion hole S3 from one end of the roller shell body 11a. The first bushing 11b is press-fitted into the insertion hole S3. The first bushing 11b rotates along with the roller shell body 11a.

The first bushing 11b has a first cylindrical section 111 and a first flange 112. The first cylindrical section 111 is formed in a hollow cylindrical shape. The first flange 112 is continuous with the end on the outer of the first cylindrical section 111 in the axial direction. The first flange 112 is a thrust collar formed in an annular shape extending radially outward from the outer periphery of the first cylindrical section 111. The first cylindrical section 111 and the first flange 112 are each made from a metal material (such as a lead bronze casting (LBC)). The first cylindrical section 111 and the first flange 112 are integrally formed by the same metal material. The first cylindrical section 111 and the first flange 112 may be separately formed from different metal materials.

The second bushing 11c is inserted into the insertion hole S3 from the other end of the roller shell body 11a. The second bushing 11c is press-fitted into the insertion hole S3. The second bushing 11c rotates along with the roller shell body 11a.

The second bushing 11c has a second cylindrical section 113 and a second flange 114. The second cylindrical section 113 is formed in a hollow cylindrical shape. The second flange 114 is continuous with the end on the outer of the second cylindrical section 113 in the axial direction. The second flange 114 is a thrust flange that is formed in an annular shape extending radially outwardly from the second cylindrical section 113. The second cylindrical section 113 and the second flange 114 are each made of metal material (such as a lead bronze casting (LBC)). The second cylindrical section 113 and the second flange 114 are integrally formed by the same metal material. The second cylindrical section 113 and the second flange 114 may be separately formed from different metal materials.

(2) Shaft 12

The shaft 12 is formed in a rod shape. The shaft 12 is inserted into the insertion hole S3 of the roller shell 11. The shaft 12 is the rotational axis of the roller shell 11. The shaft 12 has a cylindrical section 12a, a first end 12b, and second end 12c.

The cylindrical section 12a is formed in a cylindrical shape. The cylindrical section 12a has a surface T0. The cylindrical section 12a has a uniform outside diameter overall. The surface T0 is the cylindrical surface of the cylindrical section 12a. The cylindrical section 12a is disposed inside the roller shell 11.

One end of the cylindrical section 12a is disposed inside the first bushing 11b of the roller shell 11. One end of the cylindrical section 12a is inserted into the hollow part of the first bushing 11b. A first annular groove T1 for attaching the first holding ring 15a is formed at one end of the cylindrical section 12a. The other end of the cylindrical section 12a is disposed inside the second bushing 11c of the roller shell 11. The other end of the cylindrical section 12a is inserted into the hollow part of the first bushing 11b. A second annular groove T2 for attaching the second holding ring 15b is formed at the other end of the cylindrical section 12a.

The first end portion 12b is continuous with one end of the cylindrical section 12a. The first end 12b protrudes outward in the axial direction from one end of the roller shell 11. The first end 12b has a mounting face T3. The mounting face T3 is opposite the lower face of the track frame 5 when the track roller 10 is attached to the track frame 5.

The second end 12c is continuous with the other end of the cylindrical section 12a. The second end 12c protrudes outward in the axial direction from the other end of the roller shell 11. The second end 12c has a mounting face T4. The mounting-face T4 is opposite the lower face of the track frame 5 when the track roller 10 is attached to the track frame 5.

An oil line T5 is formed inside the shaft 12. The inlet of the oil line T5 is provided in the end face of the first end 12b. The inlet of the oil line T5 is sealed by a plug 36.

(3) First and Second Mounting Pieces 13a and 13b

The first mounting piece 13a is a member for fixing the first end 12b of the shaft 12 to the track frame 5. The first mounting piece 13a is formed in an Ω shape. The first mounting piece 13a has an insertion recess U1 and a pair of fixing holes U2.

The insertion recess U1 is mated with the first end 12b of the shaft 12. A fastener (such as a bolt) is passed through each fixing hole U2. The first mounting piece 13a is fixed to the lower face of the track frame 5 with fasteners that are inserted into the fixing holes U2.

The second mounting piece 13b is a member for fixing the second end 12c of the shaft 12 to the track frame 5. The second mounting piece 13b is formed in an Ω shape. The second mounting piece 13b has an insertion recess U3 and a pair of fixing holes U4.

The insertion recess U3 is mated with the second end 12c of the shaft 12. The second mounting piece 13b is positioned relative to the shaft 12 by a pin 35. A fastener (such as a bolt) is inserted into each fixing hole U4. The second mounting piece 13b is fixed to the lower face of the track frame 5 by fasteners that are inserted into the fixing holes U4.

(4) First and Second Retainers 14a and 14b

The first retainer 14a is a member for sealing in the first seal assembly 16a. The first retainer 14a can receive a load in the axial direction from the roller shell 11. The first retainer 14a is formed in an annular shape. The first retainer 14a is press-fitted to the outer periphery of the shaft 12. The first retainer 14a has an insertion hole V1, an inner peripheral face V2, an outer surface V3, and a boss B.

One end of the cylindrical section 12a of the shaft 12 is press-fitted into the insertion hole V1. The inner peripheral face V2 is the inner surface of the insertion hole V1. The inner peripheral face V2 is in contact with the surface T0 of the cylindrical section 12a of the shaft 12. The outer surface V3 is the main face (plate) of the first retainer 14a. The outer surface V3 is substantially perpendicular to the inner peripheral face V2. The outer surface V3 is opposite the first mounting piece 13a. The outer surface V3 is away from the first mounting piece 13a. The boss B is a cylindrical part that includes the inner peripheral face V2. The shaft 12 is press-fitted to the boss B.

The second retainer 14b is a member for sealing in the second seal assembly 16b. The second retainer 14b can receive a load in the axial direction from the roller shell 11. The second retainer 14b is formed in an annular shape. The second retainer 14b is press-fitted to the outer periphery of the shaft 12. The second retainer 14b has an insertion hole V4, an inner peripheral face V5, an outer surface V6, and a boss B.

The other end of the cylindrical section 12a of the shaft 12 is press-fitted into the insertion hole V4. The inner peripheral face V5 is the inner surface of the insertion hole V4. The inner peripheral face V5 is in contact with the surface T0 of the cylindrical section 12a of the shaft 12. The outer surface V6 is the main surface (plate) of the second retainer 14b. The outer surface V6 is substantially perpendicular to the inner peripheral face V5. The outer surface V6 is opposite the second mounting piece 13b. The outer surface V6 is away from the second mounting piece 13b.

As shown in FIG. 3, a first annular concave part P1 and a second annular concave part P2 are formed in the inner surface of the second retainer 14b. The first annular concave part P1 is formed outside the boss portion B in the radial direction. The first annular concave part P1 is formed inside the second annular concave part P2 in the radial direction. Part of the first seal assembly 16a is housed in the first annular concave part P1. The second annular concave part P2 is formed outside the first annular concave part P1 in the radial direction. The boss B is a cylindrical part between the inner peripheral face V5 and the first annular concave part P1. The shaft 12 is press-fitted to the boss B.

Though not shown in FIG. 3, as with the second retainer 14b, the first annular concave part P1 and the second annular concave part P2 are also formed in the inner surface of the first retainer 14a.

(5) First and Second Holding Rings 15a and 15b

The first holding ring 15a is a member for fixing the first retainer 14a to the shaft 12. The first holding ring 15a is a snap ring for keeping the first retainer 14a from coming loose from the shaft 12 in the axial direction by stopping the movement of the first retainer 14a in the axial direction of the shaft 12.

The first holding ring 15a is formed in a C shape. The first holding ring 15a is attached to the first annular groove T1 formed in the cylindrical section 12a of the shaft 12.

The second holding ring 15b is a member for fixing the second retainer 14b to the shaft 12. The second holding ring 15b is a snap ring for keeping the first retainer 14a from coming loose from the shaft 12 in the axial direction by stopping the movement of the second retainer 14b in the axial direction of the shaft 12.

The second holding ring 15b is formed in a C shape. The second holding ring 15b is attached to the second annular groove T2 formed in the cylindrical section 12a of the shaft 12.

(6) First and Second Seal Assemblies 16a and 16b

The first seal assembly 16a is sealed in between the roller shell 11 and the first retainer 14a. The first seal assembly 16a is disposed outside the boss B of the first retainer 14a in the radial direction. The first seal assembly 16a is made up of a first inner seal 17, a first inner O-ring 18, a first outer seal 19, and a first outer O-ring 20.

The first inner seal 17 is formed in an annular shape with an L-shaped cross section. The first inner seal 17 is made of a metal material (such as cast iron). The first inner O-ring 18 is formed in an annular shape. The first inner O-ring 18 is fitted to the outside of the first inner seal 17 in the radial direction. The first inner O-ring 18 is made of an elastic member (such as rubber). The first inner seal 17 and the first inner O-ring 18 are disposed in the first annular concave part P1 of the first retainer 14a.

The first outer seal 19 is formed in an annular shape with an L-shaped cross section. The first outer seal 19 is made of a metal material (such as cast iron). The first outer O-ring 20 is formed in an annular shape. The first outer O-ring 20 is fitted to the outside of the first outer seal 19. The first outer O-ring 20 is made of an elastic member (such as rubber). A first outer seal 19 and the first outer O-ring 20 are disposed in a first annular concave part S6 formed in the first end face S4 of the roller shell body 11a.

The second seal assembly 16b is sealed in between the roller shell 11 and the second retainer 14b. The second seal assembly 16b is disposed outside the boss B of the second retainer 14b in the radial direction. The second seal assembly 16b is made up of a second inner seal 21, a second inner O-ring 22, a second outer seal 23, and a second outer O-ring 24.

The second inner seal 21 is formed in an annular shape with an L-shaped cross section. The second inner seal 21 is made of a metal material (such as cast iron). The second inner O-ring 22 is formed in an annular shape. The second inner O-ring 22 is fitted to the outside of the second inner seal 21 in the radial direction. The second inner O-ring 22 is made of an elastic member (such as rubber). The second inner seal 21 and the second inner O-ring 22 are disposed in the first annular concave part P1 of the second retainer 14b.

The second outer seal 23 is formed in an annular shape with an L-shaped cross section. The second outer seal 23 is made of a metal material (such as cast iron). The second outer O-ring 24 is formed in an annular shape. The second outer O-ring 24 is fitted to the outside of the second outer seal 23 in the radial direction. The second outer O-ring 24 is made of an elastic member (such as rubber). The second outer seal 23 and the second outer O-ring 24 are disposed in a second annular concave part S8 formed in the second end face S5 of the roller shell body 11a.

Internal Structure of Track Roller 10

Figure 4:
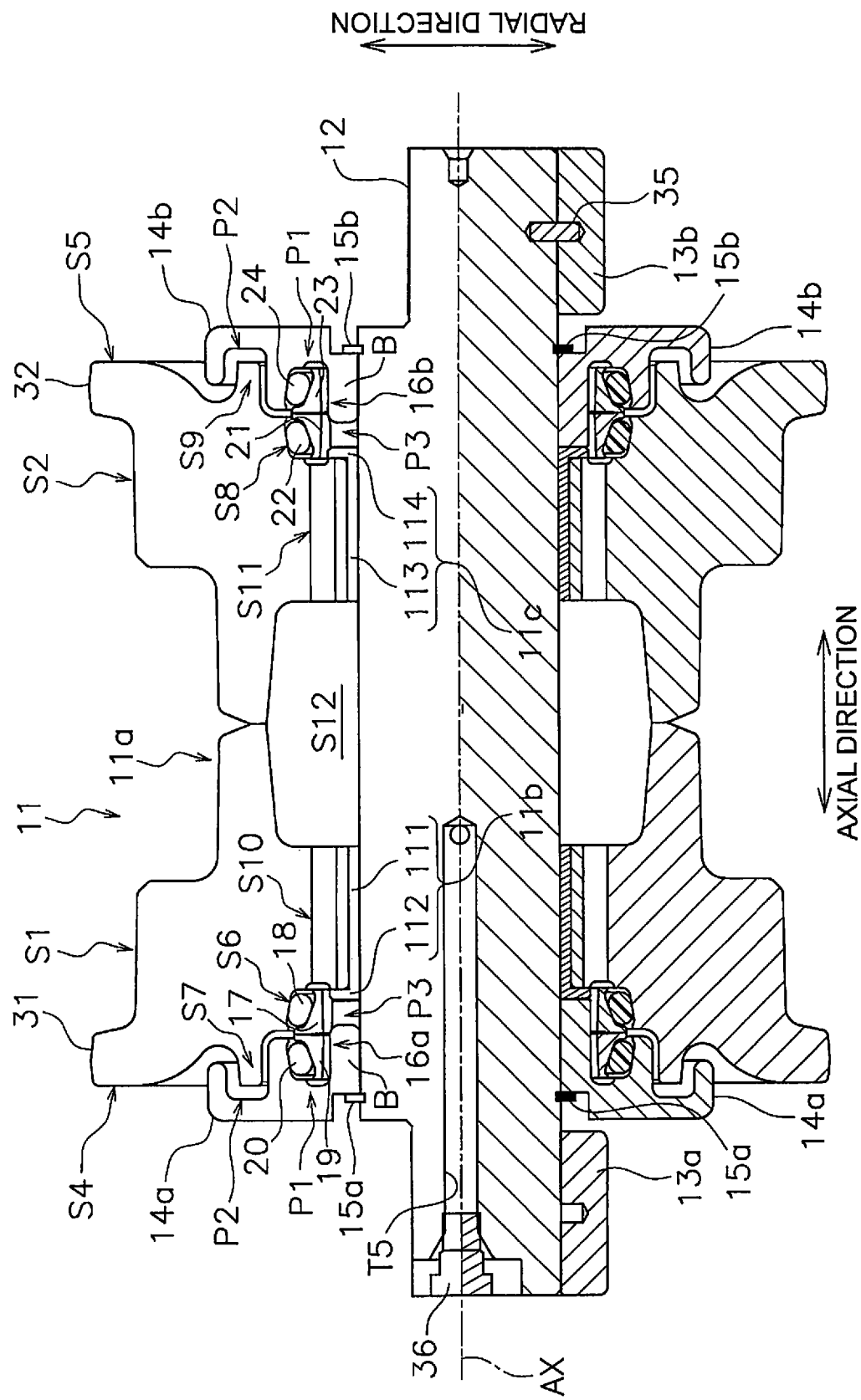
FIG. 4 is a cross section along the A-A line in the track roller of FIG. 2.

The internal structure of the track roller 10 in this embodiment will be described through reference to the drawings. FIG. 4 is a cross section along the A-A line in FIG. 2.

The roller shell 11, the first inner seal 17, the first inner O-ring 18, the second inner seal 21, and the second inner O-ring 22 are "rotating-side members" that rotate with respect to the shaft 12.

The shaft 12, the first and second mounting pieces 13a and 13b, the first and second retainers 14a and 14b, the first and second holding rings 15a and 15b, the first outer seal 19, the first outer O-ring 20, the second outer seal 23, and the second outer O-ring 24 are "fixed-side members" that are fixed with respect to the track frame.

The first bushing 11b and the second bushing 11c of the roller shell 11 are able to slide with respect to the shaft 12. The first flange 112 of the first bushing abuts on the boss B of the first retainer 14a positioned to the outside in the axial direction. The second flange 114 of the second bushing 11c abuts on the boss B of the second retainer 14b positioned to the outside in the axial direction.

The first retainer 14a and the second retainer 14b are press-fitted to the shaft 12. The first retainer 14a abuts on the first holding ring 15a positioned to the outside in the axial direction. The second retainer 14b abuts on the second holding ring 15b positioned to the outside in the axial direction.

The roller shell 11 is thus sandwiched between the first retainer 14a and the second retainer 14b, and the first retainer 14a and the second retainer 14b are fixed by the first holding ring 15a and the second holding ring 15b. Accordingly, the thrust load transmitted to the roller shell 11 from the track 8 is stopped by the press-fitting force of the first retainer 14a and the second retainer 14b with respect to the shaft 12, and by the holding force of the first holding ring 15a and the second holding ring 15b with respect to the first retainer 14a and the second retainer 14b.

As shown in FIG. 4, the first annular concave part S6 and a first annular convex part S7 are formed on the first end face S4 of the roller shell body 11a.

The first annular concave part S6 of the roller shell body 11a is formed on the outside of the first bushing 11b in the radial direction. The first annular concave part S6 of the roller shell body 11a is continuous with the first annular concave part P1 of the first retainer 14a in the axial direction. Consequently, a space for accommodating the first seal assembly 16a is formed. The first inner seal 17 and the first inner O-ring 18 are housed in the first annular concave part S6 of the roller shell body 11a. The first outer seal 19 and the first outer O-ring 20 are housed in the first annular concave part P1 of the first retainer 14a.

The first annular convex part S7 of the roller shell body 11a is formed on the outside of the first annular concave part S6 in the radial direction. The first annular convex part S7 of the roller shell body 11a is inserted into the second annular concave part P2 of the first retainer 14a. Consequently, since a labyrinth structure is formed between the roller shell 11 and the first retainer 14a, sand and dust are less likely to work their way from the outside into the gap between the first retainer 14a and the roller shell 11.

As shown in FIG. 4, the second annular concave part S8 and a second annular convex part S9 are formed on the second end face S5 of the roller shell body 11a.

The second annular concave part S8 of the roller shell body 11a is formed on the outside of the second bushing 11c in the radial direction. The second annular concave part S8 of the roller shell body 11a is continuous with the first annular concave part P1 of the second retainer 14b in the axial direction. Consequently, a space for housing the second seal assembly 16b is formed. The second inner seal 21 and the second inner O-ring 22 are housed in the second annular concave part S8 of the roller shell body 11a. The second outer seal 23 and the second outer O-ring 24 are housed in the first annular concave part P1 of the second retainer 14b.

The second annular convex part S9 of the roller shell body 11a is formed on the outside of the second annular concave part S8 in the radial direction. The second annular convex part S9 of the roller shell body 11a is inserted into the second annular concave part P2 of the second retainer 14b. Consequently, because a labyrinth structure is formed between the roller shell 11 and the second retainer 14b, it is less likely that sand or dust will come from the outside into the gap between the roller shell 11 and the second retainer 14b.

As shown in FIG. 4, a first oil line S10, a second oil line S11, and an oil reservoir S12 are formed in the interior of the roller shell body 11a. The first oil line S10 and the second oil line S11 are cylindrical spaces in the roller shell body 11a. The first oil line S10 is continuous with the first annular concave part S6 and the oil reservoir S12. The second oil line S11 is continuous with the second annular concave part S8 and the oil reservoir S12. The lubricating oil injected from the oil line T5 of the shaft 12 is supplied to the first annular concave part S6 through oil lines (not shown) formed in the interior and on the surface of the shaft 12 and through a notch P3 formed in the boss B of the first retainer 14a. The lubricating oil supplied to the first annular concave part S6 is supplied to the first oil line S10, the oil reservoir S12, the second oil line S11, and the second annular concave part S8, in that order.

Method for Assembling Track Roller 10

Next, the method for assembling the track roller 10 will be described through reference to FIGS. 2 to 4.

First, the first cylindrical section 111 of the first bushing 11b is press-fitted into the insertion hole S3 of the roller shell body 11a, and the second cylindrical section 113 of the first bushing 11b is press-fitted into the insertion hole S3 of the roller shell body 11a. When the first and second cylindrical sections 111 and 113 are press-fitted, the first and second flanges 112 and 114 come into contact with the roller shell body 11a.

Next, the shaft 12 is inserted into the first cylindrical section 111 of the first bushing 11b and the second cylindrical section 113 of the first bushing 11b.

Then, the first inner seal 17 and the first inner O-ring 18 are housed in the first annular concave part S6 of the roller shell body 11a, and the second inner seal 21 and the second inner O-ring 22 are housed in the second annular concave part S8 of the roller shell body 11a.

Next, the first outer seal 19 and the first outer O-ring 20 are housed in the first annular concave part P1 of the first retainer 14a, and the second outer seal 23 and the second outer O-ring 24 are housed in the first annular concave part P1 of the second retainer 14b.

Next, the first holding ring and 15a is attached to the first annular groove T1 of the shaft 12 in a state in which the first retainer 14a is in contact with the roller shell 11, and the second holding ring 15b is attached to the second annular groove T2 of the shaft 12 in a state in which the second retainer 14b is in contact with the roller shell 11.

The first and second mounting pieces 13a and 13b are then used to fix the assembly to the track frame 5.

The track roller 10 comprises the roller shell 11, the first retainer 14a, the second retainer 14b, the first holding ring 15a, and the second holding ring 15b. The first retainer 14a is press-fitted to the outer periphery of the shaft 12 and abuts on the first end face S4 of the roller shell 11. The second retainer 14b is press-fitted to the outer periphery of the shaft 12 and abuts on the second end face S5 of the roller shell 11. The first holding ring 15a is attached to the outer periphery of the shaft 12 on the outside of the first retainer 14a, and fixes the first retainer 14a. The second holding ring 15b is attached to the outer periphery of the shaft 12 and fixes the second retainer 14b.

Therefore, the thrust load transmitted from the track 8 to the roller shell 11 can be stopped by the press-fitting force of the first retainer 14a and the second retainer 14b with respect to the shaft 12, and by the holding force of the first holding ring 15a and the second holding ring 15b with respect to the first retainer 14a and the second retainer 14b. Therefore, there is no need to provide a central flange to the shaft 12, the outer shape of the shaft 12 can be simplified, and the number of parts can be reduced, which makes assembly easier.

The roller shell 11 has the roller shell body 11a, the first bushing 11b, and the second bushing 11c. The roller shell body 11a has the insertion hole S3. The first bushing 11b comprises the first cylindrical section 111 and the first flange 112. The first bushing 11b is press-fitted into the insertion hole S3 and this the first retainer 14a. The second bushing 11c comprises the second cylindrical section 113 and the second flange 114. The second bushing 11c is press-fitted into the insertion hole S3 and abuts on the second retainer 14b at the second flange 114.

The thrust load transmitted from the track 8 to the roller shell 11 is transmitted from the roller shell body 11a to the first retainer 14a or the second retainer 14b via the first bushing 11b or the second bushing 11c. Consequently, the outer shape of the shaft 12 can be simplified, the number of parts included in the roller shell can be reduced, and this makes assembly easier.

The first mounting piece 13a that is attached to the first end 12b of the shaft 12 is away from the first retainer 14a, and the second mounting piece 13b that is attached to the second end 12c of the shaft 12 is away from the second retainer 14b.

Therefore, the roller shell 11, which is a consumable part, can be replaced as needed, and the first mounting piece 13a and the second mounting piece 13b can be reused.

The first retainer 14a and the second retainer 14b are each formed in an annular shape.

Therefore, first retainer 14a and the second retainer 14b can be produced by forging, so surface roughness can be reduced at the face of the first retainer 14a that abuts on the first bushing 11b and at the face of the second retainer 14b that abuts on the second bushing 11c. Therefore, sliding resistance can be reduced between the first retainer 14a and the first bushing 11b, and between the second retainer 14b and the second bushing 11c.

An embodiment of the present invention was described above, but the present invention is not limited to or by the above embodiment, and various modifications are possible without departing from the gist of the invention.

In the above embodiment, the configuration of the bulldozer 1 was described as an example of a tracked vehicle, but the track roller pertaining to the present invention can also be applied to a hydraulic excavator or the like.

The invention claimed is:

1. A track roller for a tracked vehicle, comprising:
   a cylindrical roller shell;
   a shaft inserted into the roller shell;
   a first retainer press-fitted to an outer periphery of the shaft and facing a first end face of the roller shell;
   a second retainer press-fitted to the outer periphery of the shaft and facing a second end face of the roller shell;
   a first holding ring attached to the outer periphery of the shaft and fixing the first retainer;
   a second holding ring attached to the outer periphery of the shaft and fixing the second retainer;
   a first mounting piece attached to a first end of the shaft and axially spaced from the first retainer; and
   a second mounting piece attached to a second end of the shaft and axially spaced from the second retainer.

2. The track roller for a tracked vehicle according to claim 1, wherein
   the roller shell has a roller shell body, a first bushing and a second bushing,
   the roller shell body has an insertion hole;
   the first bushing includes a first cylindrical section and a first flange that extends outward in a radial direction from the first cylindrical section, and the first bushing abuts on the first retainer at the first flange; and
   the second bushing includes a second cylindrical section and a second flange that extends outward in the radial direction from the second cylindrical section, and the second bushing abuts on the second retainer at the second flange.

3. The track roller for a tracked vehicle according to claim 1, wherein
   the shaft has at one end a first annular groove to mount the first holding ring, and at the other end a second annular groove to attach the second holding ring.

4. The track roller for a tracked vehicle according to claim 1, wherein
   the first retainer and the second retainer each have
      an inner peripheral face that is in contact with an outer peripheral face of the shaft; and
      an outer peripheral face that is provided substantially perpendicular to the inner peripheral face.

5. The track roller for a tracked vehicle according to claim 1, wherein
the first retainer and the second retainer are each formed in a circular ring shape.

6. A track roller for a tracked vehicle, comprising:
a cylindrical roller shell;
a shaft inserted into the roller shell;
a first retainer press-fitted to an outer periphery of the shaft and facing a first end face of the roller shell;
a second retainer press-fitted to the outer periphery of the shaft and facing a second end face of the roller shell;
a first holding ring attached to the outer periphery of the shaft and fixing the first retainer;
a second holding ring attached to the outer periphery of the shaft and fixing the second retainer;
a first seal assembly sealed between the roller shell and the first retainer;
a second seal assembly sealed between the roller shell and the second retainer;
a first mounting piece attached to a first end of the shaft and axially spaced from the first retainer; and
a second mounting piece attached to a second end of the shaft and axially spaced from the second retainer.

7. A track roller for a tracked vehicle; comprising:
a roller shell body having an insertion hole;
a bushing press-fitted in the insertion hole and having a hollow part;
a shaft inserted into the hollow part;
a retainer press-fitted to an outer periphery at one end of the shaft and abutting on the bushing;
a holding ring attached to the outer periphery of the shaft and stopping the movement of the retainer in an axial direction of the shaft;
a mounting piece attached to the one end of the shaft and axially spaced from the retainer.

8. The track roller for a tracked vehicle according to claim 7, further comprising
a seal assembly having an inner seal and an outer seal,
the retainer having a boss to which the shaft is press-fitted, and
the seal assembly being disposed externally of the boss.

* * * * *